(12) United States Patent
Niranjan et al.

(10) Patent No.: US 9,998,970 B2
(45) Date of Patent: Jun. 12, 2018

(54) FAST VOWIFI HANDOFF USING IKE V2 OPTIMIZATION

(71) Applicant: Samsung Electronics Co., Ltd, Suwon-si (KR)

(72) Inventors: Niranjan, Mountain View, CA (US); Shu Wang, Mountain View, CA (US); Ravikanth Vanapalli, Mountain View, CA (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days. days.

(21) Appl. No.: 15/141,753

(22) Filed: Apr. 28, 2016

(65) Prior Publication Data

US 2017/0318511 A1   Nov. 2, 2017

(51) Int. Cl.
| | | |
|---|---|---|
| *H04W 36/18* | (2009.01) | |
| *H04B 17/318* | (2015.01) | |
| *H04J 11/00* | (2006.01) | |
| *H04W 12/04* | (2009.01) | |
| *H04W 12/06* | (2009.01) | |
| *H04W 80/04* | (2009.01) | |
| *H04W 84/12* | (2009.01) | |
| *H04W 88/16* | (2009.01) | |

(52) U.S. Cl.
CPC .......... *H04W 36/18* (2013.01); *H04B 17/318* (2015.01); *H04J 11/00* (2013.01); *H04W 12/04* (2013.01); *H04W 12/06* (2013.01); *H04W 80/04* (2013.01); *H04W 84/12* (2013.01); *H04W 88/16* (2013.01)

(58) Field of Classification Search
CPC ........................... H04W 72/085; H04W 76/02
USPC ............ 455/434, 435.1–2, 436–439, 41.1–2; 370/331, 332, 338, 328–329
See application file for complete search history.

(56) References Cited

U.S. PATENT DOCUMENTS

| | | | |
|---|---|---|---|
| 8,494,484 B2 * | 7/2013 | Kozu ................... | H04W 76/041 455/410 |
| 8,621,570 B2 * | 12/2013 | Naslund ................. | H04L 63/08 709/222 |
| 8,724,603 B2 * | 5/2014 | Barbu ................... | H04W 48/18 370/338 |
| 8,732,816 B2 * | 5/2014 | Sugimoto ........... | H04L 12/4633 380/277 |
| 8,964,695 B2 | 2/2015 | Bachmann et al. | |
| 2008/0254833 A1 * | 10/2008 | Keevill ............... | H04L 12/5692 455/558 |

(Continued)

FOREIGN PATENT DOCUMENTS

EP       2194686 A1    6/2010

*Primary Examiner* — Cong Tran (57) ABSTRACT

A user equipment (UE), method, and non-transitory computer-readable medium for fast VoWiFi handoff using internet key exchange (IKE) v2 optimization. The UE includes a memory and one or more processors operably connected to the memory, wherein the one or more processors are configured to determine reference signal received power (RSRP) for a long term evolution (LTE) signal and reference signal strength indicator (RSSI) for a WiFi signal, in response to at least the RSSI of the WiFi signal being greater than an RSSI threshold, perform a pre-setup of the IPsec tunnel, determine whether a handoff is to be performed, and in response to a determination that the handoff is to be performed, perform a completion of the IPsec tunnel.

20 Claims, 8 Drawing Sheets

(56) References Cited

U.S. PATENT DOCUMENTS

| | | | |
|---|---|---|---|
| 2012/0113959 A1* | 5/2012 | Sugizaki | H04W 36/0016 370/331 |
| 2013/0058275 A1* | 3/2013 | Melia | H04W 60/005 370/328 |
| 2013/0322347 A1 | 12/2013 | Alex et al. | |
| 2014/0341109 A1* | 11/2014 | Cartmell | H04L 45/308 370/328 |
| 2014/0376511 A1 | 12/2014 | Kalapatapu et al. | |
| 2015/0111569 A1* | 4/2015 | Gupta | H04W 4/22 455/426.1 |
| 2015/0173111 A1* | 6/2015 | Agarwal | H04W 8/04 370/329 |
| 2015/0350983 A1* | 12/2015 | Kwok | H04L 65/1069 370/331 |
| 2016/0029211 A1* | 1/2016 | Furuta | H04L 9/088 380/270 |
| 2016/0285627 A1* | 9/2016 | Sedlacek | H04L 43/00 |

* cited by examiner

FAST VOWIFI HANDOFF USING IKE V2 OPTIMIZATION

TECHNICAL FIELD

This disclosure relates generally to handoff of wireless services. More specifically, this disclosure relates to fast VoWiFi handoff using internet key exchange (IKE) v2 optimization.

BACKGROUND

Many operators are beginning to commercialize evolved packet data gateway (ePDG). One of the advantages of ePDG is that it allows seamless handoff of communication services (voice, video, etc.) between long-term evolution (LTE) and wireless fidelity (WiFi).

But one of the drawbacks of ePDG technology may have longer connection establishment time comparing to other cellular technologies. Setting up APN connection on ePDG requires internet key exchange version 2 (IKEv2) Phase 1 tunnel setup, extensible authentication protocol method for universal mobile telecommunications system (UTMS) authentication and key agreement (EAP-AKA) authentication and child tunnel setup. With deteriorating cellular connection, this delay leads to bad user experience and access point name (APN) connection delay adds up when round-trip time (RTT) delay is high on WiFi connection.

Another disadvantage of LTE<->WiFi handoff is that APN connection is torn down completely on existing radio access technology (RAT) when connection is established on new RAT. The makes it more computation intensive especially for ePDG connection, which takes more time.

SUMMARY

This disclosure provides fast VoWiFi handoff using IKEv2 optimization.

In a first embodiment, a client device for fast VoWiFi handoff using internet key exchange (IKE) v2 optimization is provided. The UE includes a memory and one or more processors operably connected to the memory. The one or more processors are configured to determine reference signal received power (RSRP) for a long term evolution (LTE) signal and reference signal strength indicator (RSSI) for a WiFi signal, in response to at least the RSSI of the WiFi signal being greater than an RSSI threshold, perform a pre-setup of the internet protocol security (IPsec) tunnel, determine whether a handoff is to be performed, and in response to a determination that the handoff is to be performed, perform a completion of the IPsec tunnel.

In a second embodiment, a method for fast VoWiFi handoff using internet key exchange (IKE) v2 optimization is provided. The method includes determining reference signal received power (RSRP) for a long term evolution (LTE) signal and reference signal strength indicator (RSSI) for a WiFi signal, in response to at least the RSSI of the WiFi signal being greater than an RSSI threshold, performing a pre-setup of the IPsec tunnel, determining whether a handoff is to be performed, and in response to a determination that the handoff is to be performed, performing a completion of the IPsec tunnel In a third embodiment, non-transitory computer readable medium embodying a computer program is provided. The computer program comprising computer readable program code that when executed causes at least one processing device to determine reference signal received power (RSRP) for a long term evolution (LTE) signal and reference signal strength indicator (RSSI) for a WiFi signal, in response to at least the RSSI of the WiFi signal being greater than an RSSI threshold, perform a pre-setup of the IPsec tunnel, determine whether a handoff is to be performed, and in response to a determination that the handoff is to be performed, perform a completion of the IPsec tunnel.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 10, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

Figure 1:
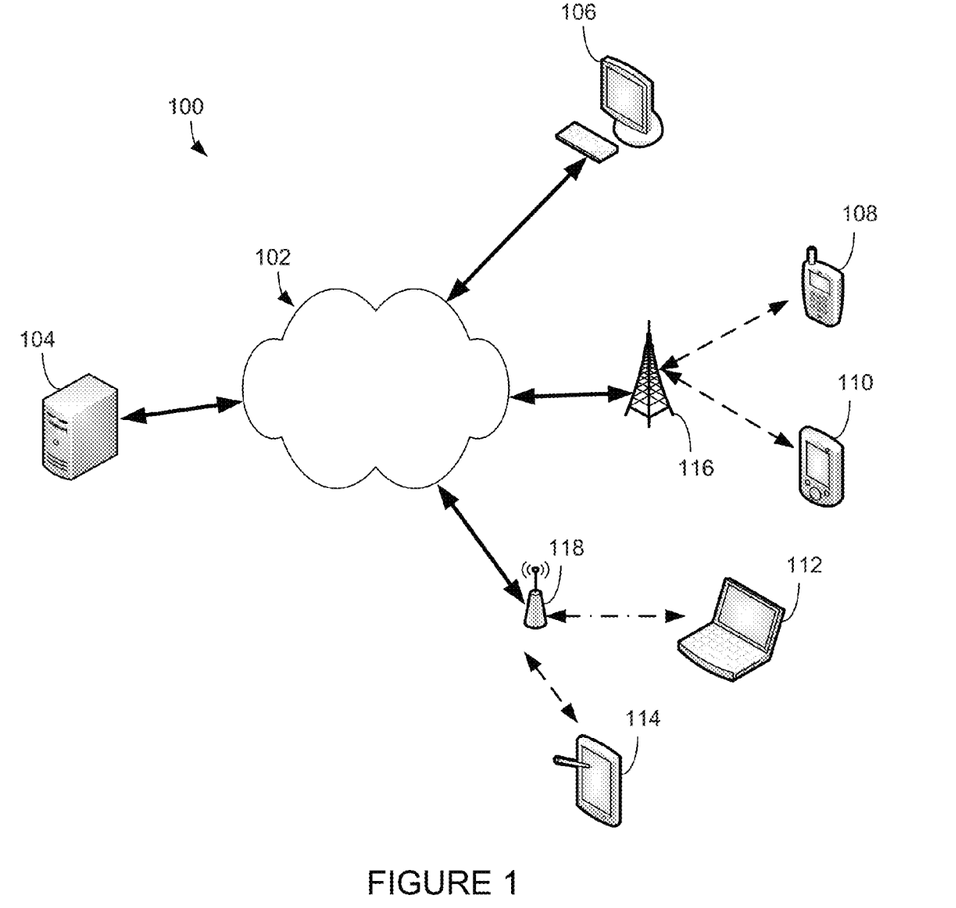
FIG. 1 illustrates an example computing system according to various embodiments of the present disclosure.

FIG. 1 illustrates an example computing system 100 according to this disclosure. The embodiment of the computing system 100 shown in FIG. 1 is for illustration only. Other embodiments of the computing system 100 could be used without departing from the scope of this disclosure.

As shown in FIG. 1, the system 100 includes a network 102, which facilitates communication between various components in the system 100. For example, the network 102 may communicate internet protocol (IP) packets, frame relay frames, asynchronous transfer mode (ATM) cells, or other information between network addresses. The network 102 may include one or more local area networks (LANs), metropolitan area networks (MANs), wide area networks (WANs), all or a portion of a global network such as the Internet, or any other communication system or systems at one or more locations.

The network 102 facilitates communications between at least one server 104 and various client devices 106-114. Each server 104 includes any suitable computing or processing device that can provide computing services for one or more client devices, including providing multi-endpoint services for evolved packet data gateway (ePDG) supported devices. Each server 104 could, for example, include one or more processing devices, one or more memories storing instructions and data, and one or more network interfaces facilitating communication over the network 102 or simultaneously transmit an incoming call to multiple endpoint devices.

Each client device 106-114 represents any suitable computing or processing device that interacts with at least one server or other computing device(s) over the network 102. In this example, the client devices 106-114 include a desktop computer 106, a mobile telephone or smartphone 108, a personal digital assistant (PDA) 110, a laptop computer 112, and a tablet computer 114. However, any other or additional client devices could be used in the computing system 100.

In this example, some client devices 108-114 communicate indirectly with the network 102. For example, the client devices 108-110 communicate via one or more base stations 116, such as cellular base stations or eNodeBs. Also, the client devices 112-114 communicate via one or more wireless access points 118, such as IEEE 802.11 wireless access points. Note that these are for illustration only and that each client device could communicate directly with the network 102 or indirectly with the network 102 via any suitable intermediate device(s) or network(s).

In this illustrative embodiment, computing system 100 provides for fast wireless fidelity (WiFi) handoff using internet key exchange version 2 (IKEv2) optimization. For example, client devices 108-114 may provide for operation of fast VoWiFi handoff between network and WiFi using IKEv2 optimization.

Although FIG. 1 illustrates one example of a computing system 100, various changes may be made to FIG. 1. For example, the system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
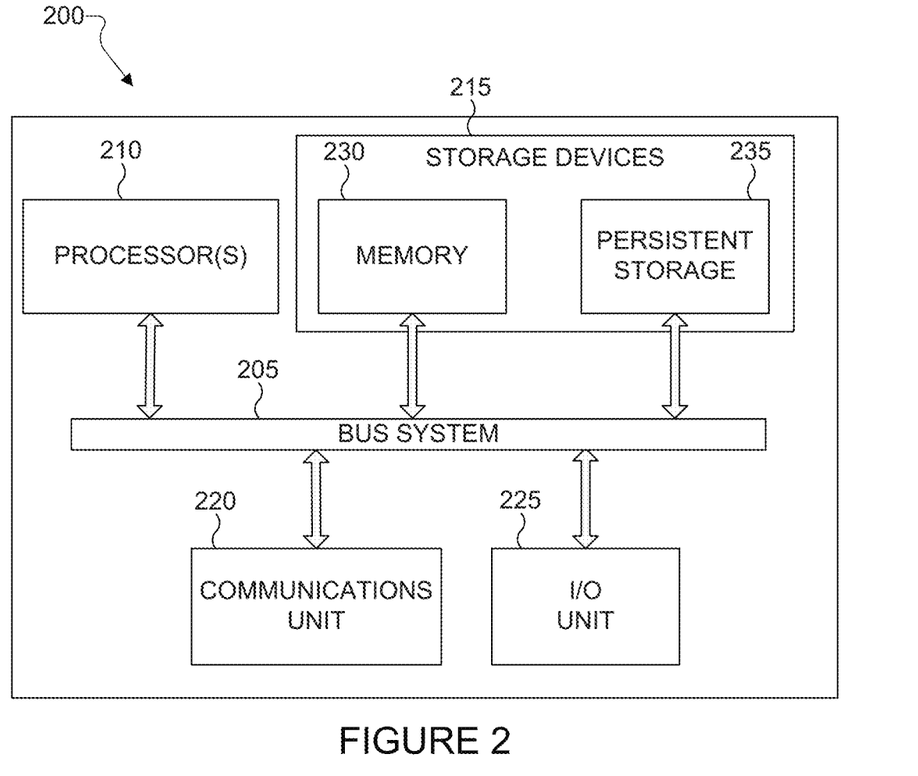
FIGS. 2 and 3 illustrate example devices in a computing system according to various embodiments of the present disclosure.
Figure 3:
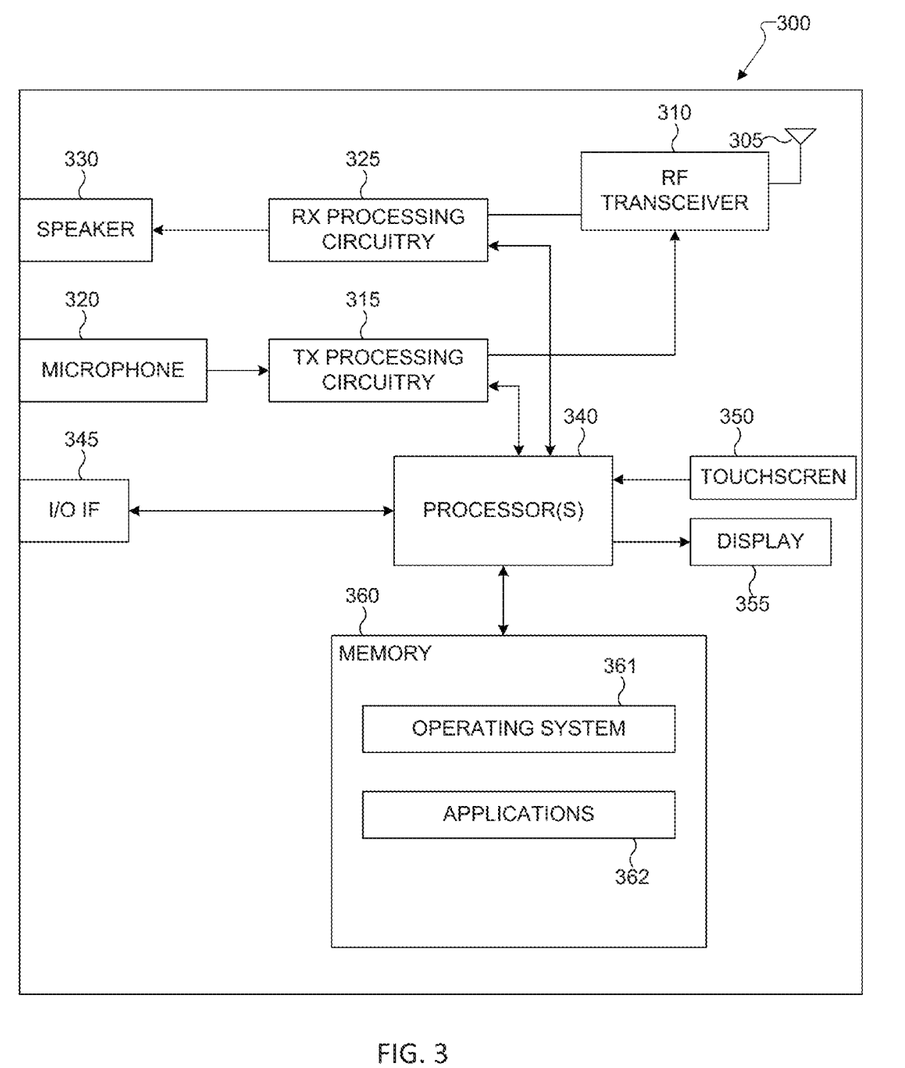

FIGS. 2 and 3 illustrate example devices in a computing system according to this disclosure. In particular, FIG. 2 illustrates an example server 200, and FIG. 3 illustrates an example client device 300. The server 200 could represent the server 104 in FIG. 1, and the client device 300 could represent one or more of the client devices 106-114 in FIG. 1.

As shown in FIG. 2, the server 200, such as an ePDG gateway, includes a bus system 205, which supports communication between one or more processors 210, at least one storage device 215, at least one communication interface 220, and at least one input/output (I/O) unit 225.

The processor(s) 210 execute instructions that may be loaded into a memory 230. The processor(s) 210 may include any suitable number(s) and type(s) of processors or other devices in any suitable arrangement. Example types of processor(s) 210 include microprocessors, microcontrollers, digital signal processors, field programmable gate arrays, application specific integrated circuits, and discreet circuitry. The processor(s) 210 is configured to perform operations for fast VoWiFi handoff using IKEv2 optimization.

The memory 230 and a persistent storage 235 are examples of storage devices 215, which represent any structure(s) capable of storing and facilitating retrieval of information (such as data, program code, and/or other suitable information on a temporary or permanent basis). The memory 230 may represent a random access memory or any other suitable volatile or non-volatile storage device(s). The persistent storage 235 may contain one or more components or devices supporting longer-term storage of data, such as a ready only memory, hard drive, Flash memory, or optical disc.

The communication interface 220 supports communications with other systems or devices. For example, the communication interface 220 could include a network interface card or a wireless transceiver facilitating communications over the network 102. The communication interface 220 may support communications through any suitable physical or wireless communication link(s).

The I/O unit 225 allows for input and output of data. For example, the I/O unit 225 may provide a connection for user input through a keyboard, mouse, keypad, touchscreen, or other suitable input device. The I/O unit 225 may also send output to a display, printer, or other suitable output device.

In this illustrative embodiment, server 200 may implement an apparatus that provides for fast VoWiFi handoff using IKEv2 optimization, as will be discussed in greater detail below. Note that while FIG. 2 is described as representing the server 104 of FIG. 1, the same or similar structure could be used in one or more of the client devices 106-114. For example, a laptop or desktop computer could have the same or similar structure as that shown in FIG. 2.

As shown in FIG. 3, the client device 300, such as a user equipment (UE), includes an antenna 305, a radio frequency (RF) transceiver 310, transmit (TX) processing circuitry 315, a microphone 320, and receive (RX) processing circuitry 325. The client device 300 also includes a speaker 330, one or more processors 340, an input/output (I/O) interface (IF) 345, a touchscreen 350, a display 355, and a memory 360. The memory 360 includes a basic operating system (OS) program 361 and one or more applications 362.

The RF transceiver 310 receives, from the antenna 305, an incoming RF signal transmitted by another component in a system. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor(s) 340 for further processing (such as for web browsing data).

The TX processing circuitry 315 receives analog or digital voice data from the microphone 320 or other outgoing baseband data (such as web data, e-mail, or interactive video game data) from the processor(s) 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor(s) 340 can include one or more processors or other processing devices and execute the basic OS program 361 stored in the memory 360 in order to control the overall operation of the client device 300. For example, the processor(s) 340 could control the reception of forward channel signals and the transmission of reverse channel signals by the RF transceiver 310, the RX processing circuitry 325, and the TX processing circuitry 315 in accordance with well-known principles. In some embodiments, the processor(s) 340 includes at least one microprocessor or microcontroller.

The processor(s) 340 is also capable of executing other processes and programs resident in the memory 360, such as operations for fast VoWiFi handoff using IKEv2 optimization. The processor(s) 340 can move data into or out of the memory 360 as required by an executing process. In some embodiments, the processor(s) 340 is configured to execute the applications 362 based on the OS program 361 or in response to signals received from external devices or an operator. The processor(s) 340 is also coupled to the I/O interface 345, which provides the client device 300 with the ability to connect to other devices such as laptop computers and handheld computers. The I/O interface 345 is the communication path between these accessories and the processor(s) 340.

The processor(s) 340 is also coupled to the touchscreen 350 and the display 355. The operator of the client device 300 can use the touchscreen 350 to enter data into the client device 300. The display 355 may be a liquid crystal display or other display capable of rendering text and/or at least limited graphics, such as from web sites.

The memory 360 is coupled to the processor(s) 340. Part of the memory 360 could include a random access memory (RAM), and another part of the memory 360 could include a flash memory or other read-only memory (ROM).

As will be discussed in greater detail below, in this illustrative embodiment, client device 300 implements an apparatus that can initiate or receive an incoming call to or from server 104 over network 102. Although FIGS. 2 and 3 illustrate examples of devices in a computing system, various changes may be made to FIGS. 2 and 3. For example, various components in FIGS. 2 and 3 could be combined, further subdivided, or omitted and additional components could be added according to particular needs. As a particular example, the processor(s) 340 could be divided into multiple processors, such as one or more central processing units (CPUs) and one or more graphics processing units (GPUs). Also, while FIG. 3 illustrates the client device 300 configured as a mobile telephone or smartphone, client devices could be configured to operate as other types of mobile or stationary devices. In addition, as with computing and communication networks, client devices and servers can come in a wide variety of configurations, and FIGS. 2 and 3 do not limit this disclosure to any particular client device or server.

Figure 4:
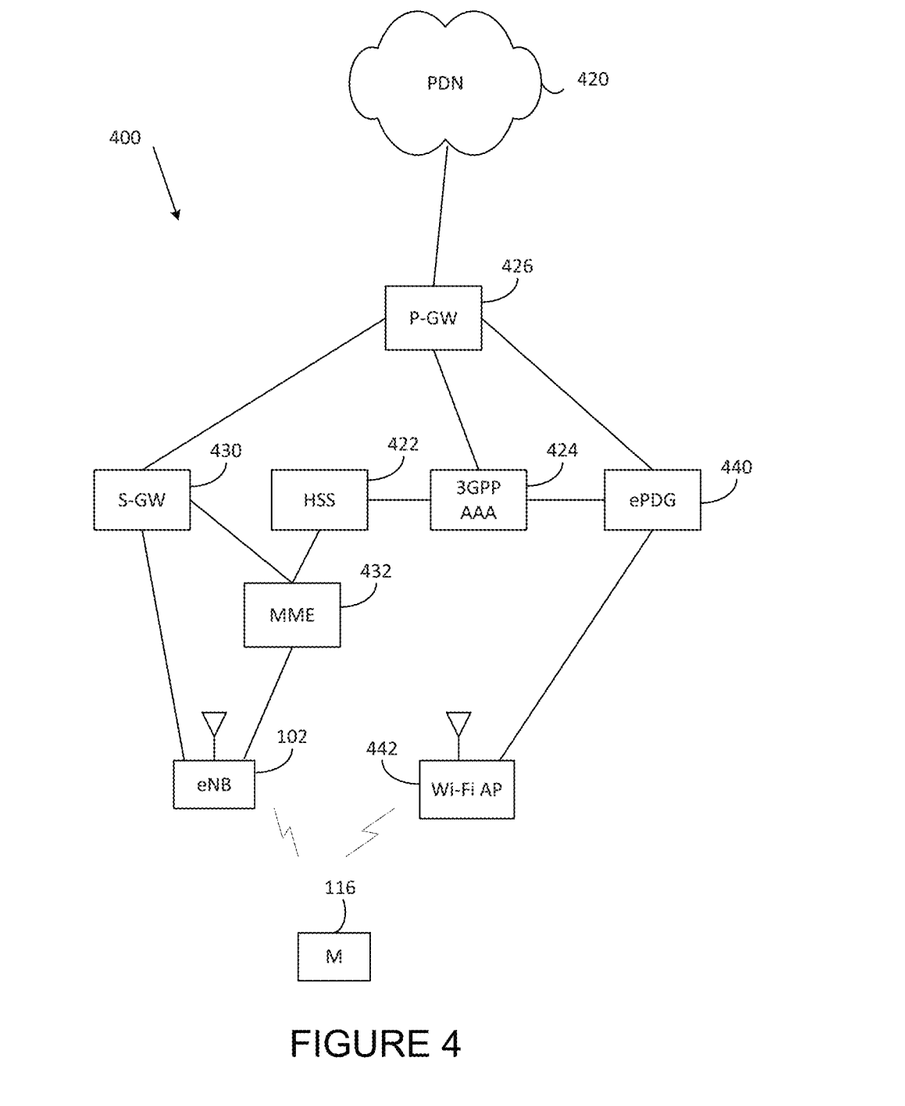
FIG. 4 illustrates an example wireless network with an evolved packet data gateway (ePDG) according to various embodiments of this disclosure.

FIG. 4 illustrates an example wireless network 400 with an evolved Packet Data Gateway (ePDG) 440 according to various embodiments of this disclosure. The embodiment of the wireless network 400 shown in FIG. 4 is for illustration only. Other embodiments of the wireless network 400 could be used without departing from the scope of this disclosure.

In FIG. 4, the wireless network 400 includes UE 116, a Packet Data Network (PDN) 420, a Home Subscriber Server (HSS) 422, a 3GPP (Authentication, Authorization and Accounting (AAA) 424, PDN-gateway (P-GW) 426, a Serving Gateway (S-GW) 430, a Mobility Management Entity (MME) 432, a base station (BS) 102, the evolved Packet Data Gateway (ePDG) 440 and a Wireless Fidelity Access Point (Wi-Fi AP) 442. The wireless network 400 can work in cooperation and as part of wireless network 100 as shown in FIG. 1.

In an embodiment of this disclosure, the UE 116 receives data from the PDN 420 through the P-GW 426, the S-GW 430, and the BS 102, and transmits data to the PDN 420. When connection state with the BS 102 becomes weak, the UE 116 handovers to the Wi-Fi AP 442. The UE 116 communicates with the 3GPP AAA server 424 to perform authentication. If the authentication is successfully performed, in an example using Proxy Mobile IPv6 (PMIPv6) protocol, the ePDG 440 transmits a Proxy Binding Update (PBU) message to the P-GW 426. The PBU message is a message for requesting that a path directing to the UE 116 be changed. The P-GW 426 having received the PBU message changes a path directing to the UE 116 and transmits a Proxy Binding Acknowledge (PBA) message to the ePDG 440 as a response with respect to the PBU message.

According to another embodiment, the ePDG 440 can be connected to the P-GW 426 through a General packet radio service Tunneling Protocol (GTP) path instead of a PMIPv6 path. In this example, the ePDG 440 transmits a Create Session Request message instead of the PBU to the P-GW 426 and receives a Create Session Response message from the P-GW 426 to open a GTP path.

Although FIG. 4 illustrates one example of UE 116, various changes may be made to FIG. 4. For example, various components in FIG. 4 could be combined, further subdivided, or omitted and additional components could be added according to particular needs. As a particular example, while FIG. 4 illustrates the UE 116 configured as a mobile telephone or smartphone, UEs could be configured to operate as other types of mobile or stationary devices.

Figure 5:
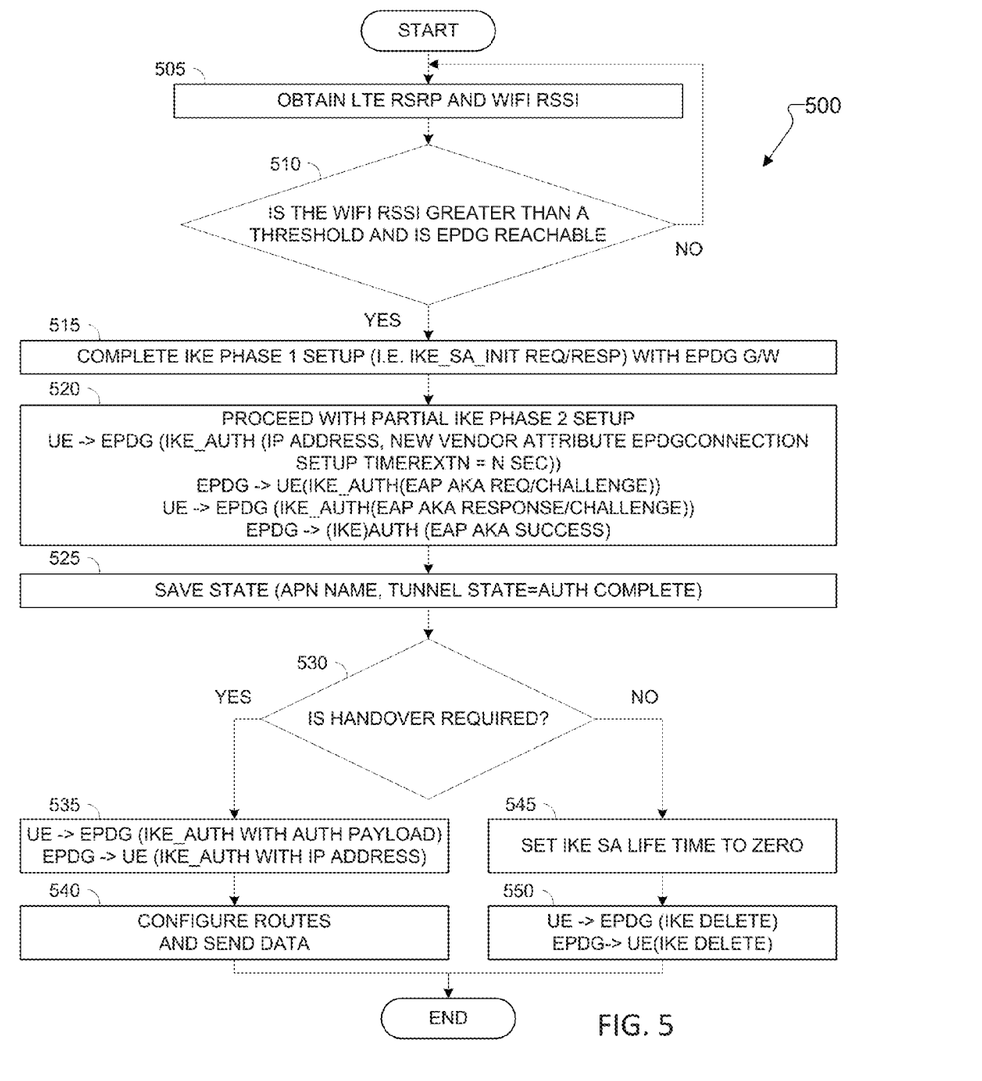
FIG. 5 illustrates an example flow chart of a fast VoWiFi tunnel setup using a partial tunnel pre-setup according to various embodiments of the present disclosure.

FIG. 5 illustrates an example flow chart 500 of a fast VoWiFi tunnel setup using a partial tunnel pre-setup according to various embodiments of the present disclosure.

In operation 505, the UE 300 obtains a reference signal received power (RSRP) for a LTE signal and a reference signal strength indicator (RSSI) for a WiFi signal.

In operation 510, the UE 300 determines whether the pre-setup of IKE tunnel is needed. In a cellular preferred mode for the UE 300, the determination is if LTE RSRP is less than a threshold and WiFi RSSI is greater than a threshold and ePDG is reachable. In a WiFi preferred mode for the UE 300, the determination is if the WiFi RSSI is greater than a threshold and ePDG is reachable. The UE 300 triggers the pre-setup of IKE tunnel.

In operation 515, the UE 300 completes the first phase of the setup of a partial IPsec tunnel. The UE 300 begins setting up the IKE tunnel with an ePDG gateway 200. The first part of the pre-setup of the tunnels includes negotiating the IKE_SA (security association). The UE 300 transmits an IKE security association initiation request message, such as an IKE_SA_INIT request, to the ePDG gateway 200. The UE 300 receives an IKE security association initiation response message, such as an IKE_SA_INIT response, from the ePDG gateway 200.

In operation 520, the UE 300 proceeds with the phase two setup of a partial IPsec Tunnel. The second part of the pre-setup is to finish EAP-AKA authentication with ePDG in IKE phase 2. The UE 300 transmits an authentication request message, such as an IKE_AUTH request, to the ePDG gateway 200. The authentication request message includes the information for handover IP, an ePDG_CONN_SETUP_TIMER_EXT vendor attribute with a value equal to "N" seconds. In order for ePDG to keep the partial IKEv2 setup context from timing out, an IKE connection setup timer on ePDG is extended. When ePDG receives ePDG_CONN_SETUP_TIMER_EXT vendor attribute from UE IKE_AUTH message request, ePDG extends the IKE connection setup timer to the requested value. In this way, IKE partial setup context can be maintained on both UE and ePDG Gateway sides. The UE 300 receives an EAP-AKA challenge request from the ePDG gateway 200. The UE 300 transmits EAP challenge calculation results to the ePDG gateway 200. The UE 300 receives an EAP success message from the ePDG gateway 200.

In operation 525, once the EAP success message is received, the UE 300 saves the state of the IKE tunnel pre-setup including, for example, the APN name and the IPSec Tunnel state. At this point the partial IKE tunnel pre-setup is complete.

In operation 530, The UE 300 determines whether handoff is required. In operation 535, when handoff is required, the UE 300 continues the IKE tunnel phase 2 setup. The last IKE authentication is triggered. The UE 300 transmits the authentication payload to the ePDG gateway 200. The UE 300 receives an IP address allocated for the ePDG connection. In operation 540, the UE 300 configures the routes for data path and begins to send data over the industrial wireless LAN (IWLAN) or WiFi.

In operation 545, when handover is not required, the UE 300 deletes the pre-setup tunnel. The UE sets the IKEv2 SA life time to equal zero. In operation 550, the UE 300 transmits an IKE delete message to the ePDG gateway 200 and receives an IKE delete message from the ePDG gateway 200.

Figure 6:
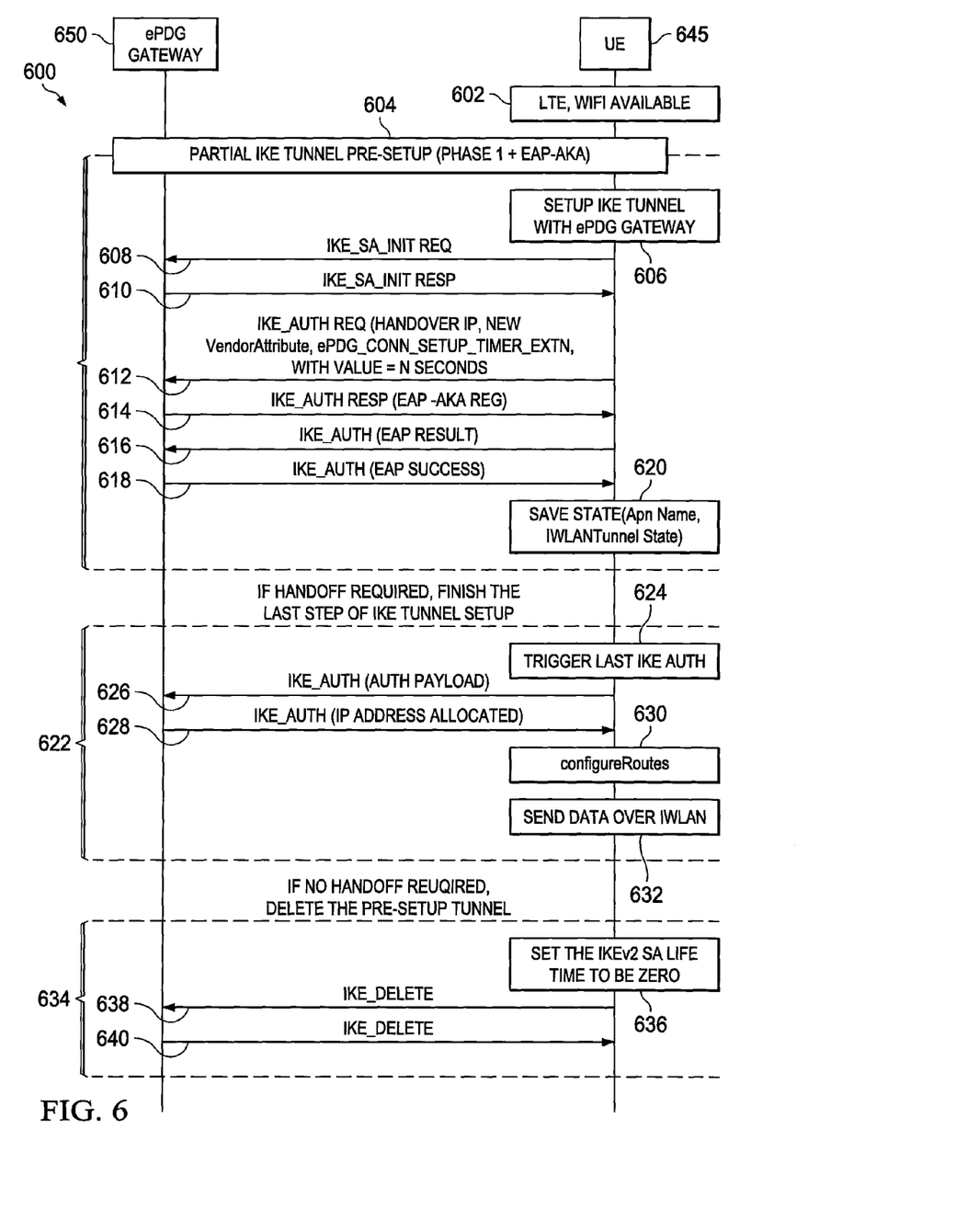
FIG. 6 illustrates an example sequence flow for fast VoWiFi tunnel setup with delayed IP address allocation according to various embodiments of the present disclosure.

Although FIG. 5 illustrates one example of a flow chart 500 of a fast VoWiFi tunnel setup using a partial tunnel pre-setup, various changes may be made to FIG. 5. For example, while shown as a series of operations, various operations could overlap, occur in parallel, occur in a different order, or occur multiple times FIG. 6 illustrates an example sequence flow 600 for fast VoWiFi tunnel setup with delayed IP address allocation according to various embodiments of the present disclosure;

In operation 602, the UE 645 determines whether LTE and WiFi connections are available. The UE 645 gets the LTE RSRP and WiFi RSSI to determine whether the pre-setup of IKE tunnel is needed. If the RSRP of the LTE signal is less than a RSRP threshold and the RSSI of the WiFi signal being greater than an RSSI threshold and ePDG is reachable in cellular preferred mode or if the RSSI of the WiFi signal being greater than an RSSI threshold and ePDG is reachable in WiFi preferred mode, the UE 300 triggers the pre-setup of IKE tunnel.

In operation 604, the UE begins pre-setup of a partial IKE tunnel. The UE begins setting up the IKE tunnel with an ePDG gateway in operation 606. The first part of the pre-setup of the tunnels includes negotiating the IKE security association. In operation 608, the UE 645 transmits an IKE security association initiation request message, such as an IKE_SA_INIT request, to the ePDG gateway 650. In operation 610, the UE 645 receives an IKE security association initiation response message, such as an IKE_SA_INIT response, from the ePDG gateway 650.

The second part of the pre-setup is the EAP-AKA authentication of IKE phase 2. In operation 612, the UE 645 transmits an authentication request message, such as an IKE_AUTH request, to the ePDG gateway 650. The authentication request message includes the information for handover IP, the newVendorattribute, a connection setup timer extension, such as an ePDG_CONN_SETUP_TIMER_EXTN message, with a value equal to "N" seconds. When ePDG receives ePDG_CONN_SETUP_TIMER_EXT vendor attribute from the IKE_AUTH message request of UE 645, ePDG extends the IKE connection setup timer to the requested value. In this way, IKE partial setup context can be maintained on both UE and ePDG Gateway sides. In operation 614, the UE 645 receives an EAP-AKA challenge request from the ePDG gateway 650. In operation 616, the UE 645 transmits EAP challenge calculation results to the ePDG gateway 650. In operation 618, the UE 645 receives an EAP success message from the ePDG gateway 650. Once the EAP success message is received, the UE 645 saves the state of the IKE tunnel pre-setup including, for example, the APN name and the IWLAN Tunnel state. At this point the partial IKE tunnel pre-setup is complete.

The UE determines whether handoff is required. In operation 622, when handoff is required, the UE 645 continues the IKE tunnel setup. In operation 624, the last IKE authentication is triggered. In operation 626, the UE 645 transmits the authentication payload to the ePDG gateway 650. In operation 628, the UE 645 receives an IP address allocated for the WiFi connection. In operation 630, the UE 645 configures the routes for data path. In operation 632, the UE begins to send data over the IWLAN or WiFi.

In operation 634, when handover is not required, the UE 645 deletes the pre-setup tunnel. In operation 636, the UE sets the IKEv2 SA life time to equal zero. In operation 638, the UE 645 transmits an IKE delete message to the ePDG gateway 650. In operation 640, the UE 645 receives an IKE delete message.

Although FIG. 6 illustrates one example of a sequence flow 600 of a fast VoWiFi tunnel setup using a partial tunnel pre-setup, various changes may be made to FIG. 6. For example, while shown as a series of operations, various operations could overlap, occur in parallel, occur in a different order, or occur multiple times FIG. 7 illustrates an example ePDG connection setup time extension attribute 700 according to various embodiments of the present disclosure.

The ePDG connection setup time extension attribute 700 includes an R field 705 of 1 byte, an attribute type 710 of 15 bits with the value of 20000, a length 715 of 2 octets, and a connection setup timer extension value 720 of 0 or more octets. The ePDG connection setup time extension vendor attribute 700 is sent to the ePDG gateway 200 in IKE_AUTH message toprevent the case where the IKE connection setup timer value of ePDG is too small and the pre-setup tunnel context is cleared on ePDG when the IKE connection setup timer of ePDG expires. The connection setup timer extension value 720 of the ePDG connection setup time extension vendor attribute 700 in the UE 300 is set to a value larger enough to delay the timing out of the tunnel setup for a suitable period of time. By using the proposed ePDG connection setup time extension vendor attribute, no major network upgrade is required. If ePDG gateway supports the proposed vendor attribute, then the IKE session setup timer would be extended on the network side based on our proposed attribute. If ePDG gateway doesn't support the attribute, it can silently ignore it and UE falls back to the existing handover mechanism.

Figure 7:
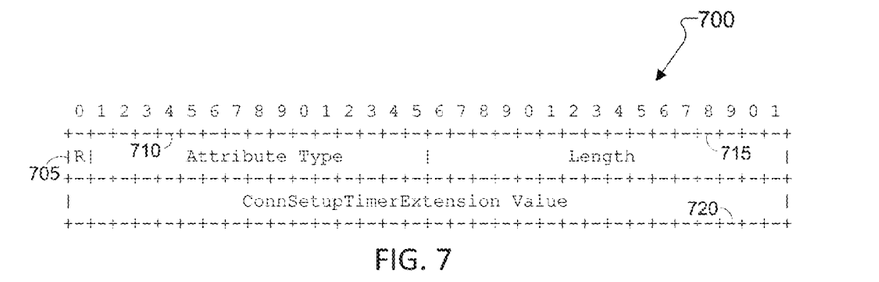
FIG. 7 illustrates an example ePDG connection setup time extension message according to various embodiments of the present disclosure.

Although FIG. 7 illustrates one example of an ePDG connection setup time extension message 700, various changes may be made to FIG. 7.

Figure 8:
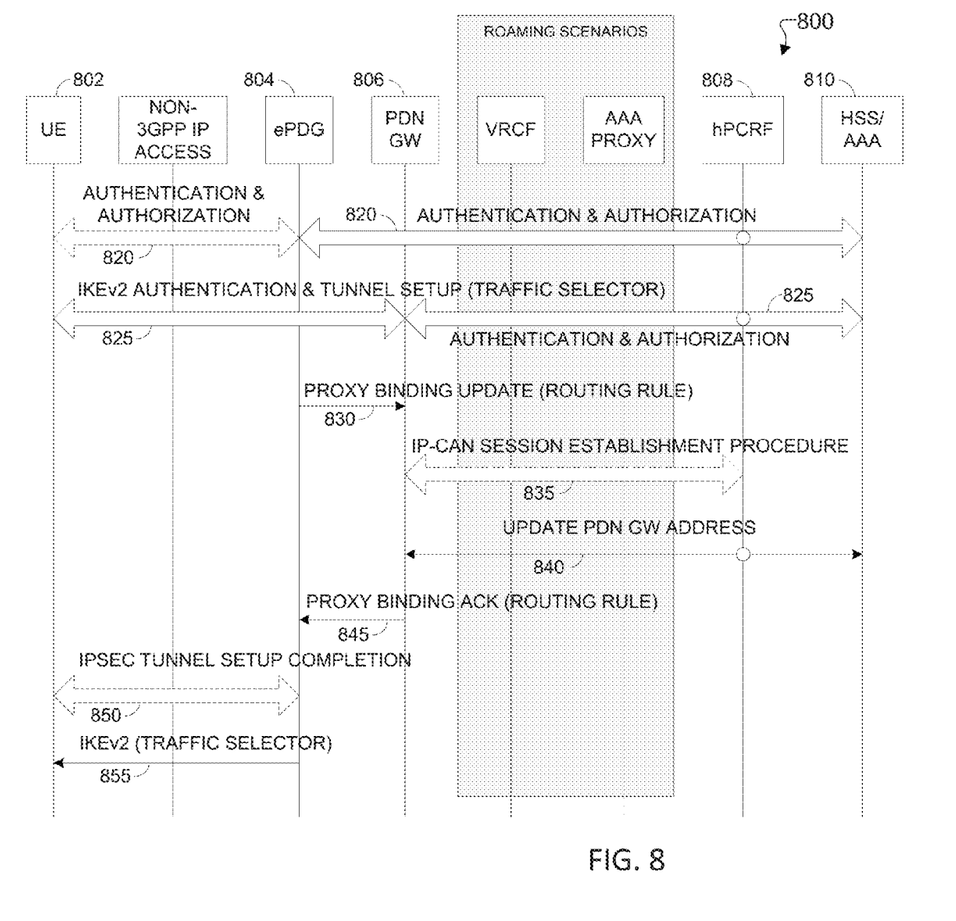
FIG. 8 illustrates an example sequence flow for pre-setup of an IPSec connection over WLAN+ePDG according to various embodiments of the present disclosure.
Figure 9:
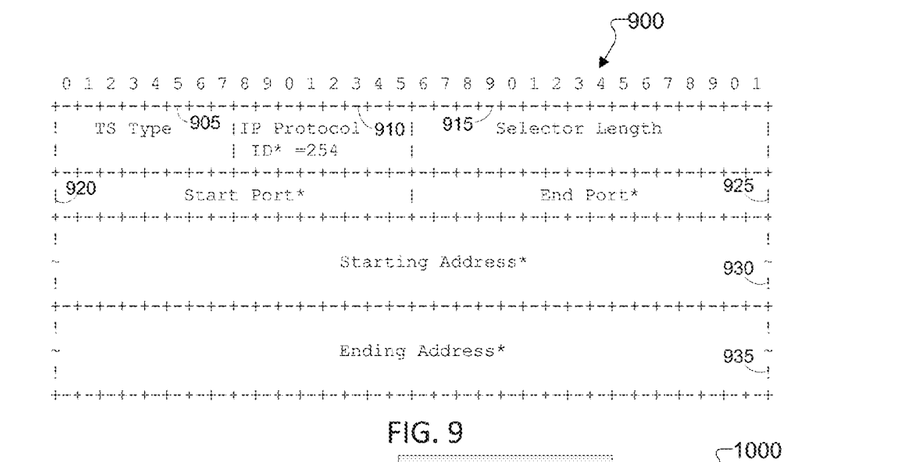
FIG. 9 illustrates an example routing rule message according to various embodiments of the present disclosure.
Figure 10:
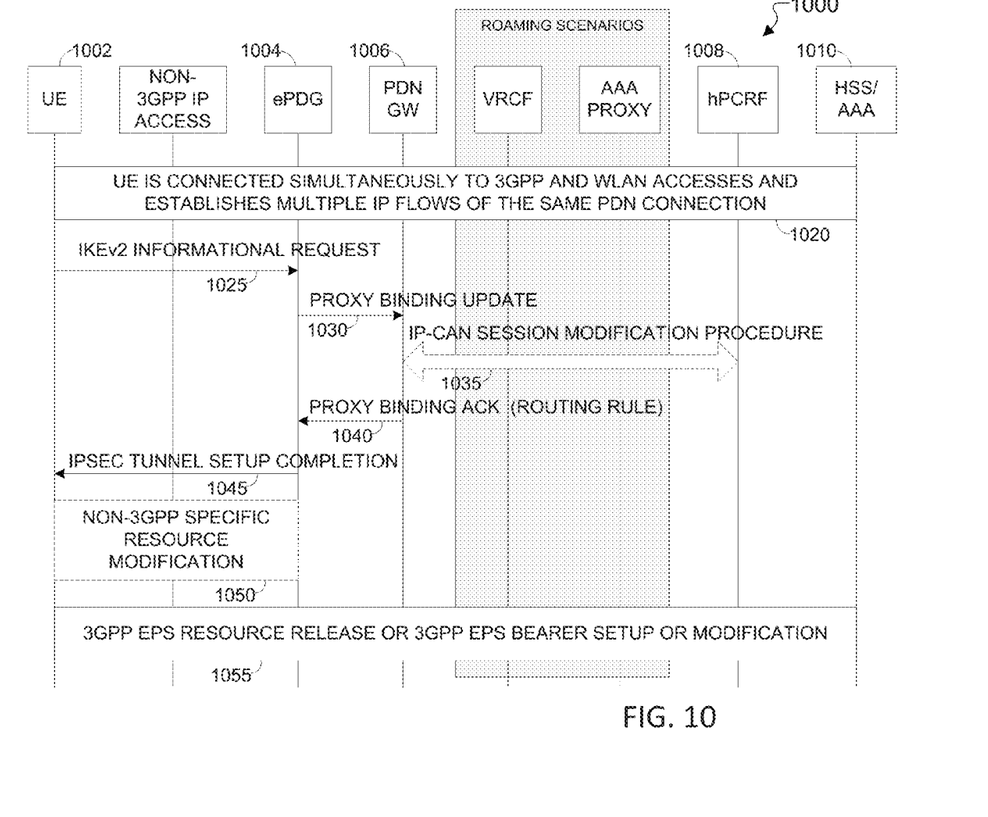
FIG. 10 illustrates an example sequence flow for activation of the pre-setup tunnel according to various embodiments of the present disclosure.

FIGS. 8-10 illustrate using an IKEv2 traffic selector for the fast handoff. 3GPP TS 23.861 defines Network Based (NB) IP flow mobility which enables UE to simultaneously connect to 3GPP access and non-3GPP WLAN access for the same PDN. When network supports NB-IP flow mobility, we can use IKEv2 traffic selector based approach for fast handoff optimization: before cellular connection deteriorates and the handoff criteria are met, the UE 300 can perform a pre-setup internet protocol security (IPSec) connection over WiFi+ePDG. But in the IPSec connection the routing rule is set as de-activated to not allow traffic to pass through the pre-setup tunnel, which is illustrated in FIG. 8. Once handoff criteria are met, the UE 300 updates the routing rule to allow the handover of traffic from LTE to WLAN, which is illustrated in FIG. 10.

FIG. 8 illustrates an example sequence flow 800 for pre-setup of an IPSec connection over WLAN+ePDG based on NB-IP Flow Mobility according to various embodiments of the present disclosure.

In operation 820, the UE 802 discovers a WLAN and performs the authentication and authorization procedure with third generation mobile system (3GPP) evolved packet core (EPC) via the WLAN access.

In operation 825, the IKEv2 authentication and tunnel setup procedure are performed via the WLAN access between the UE 802, ePDG 804 and 3GPP AAA Server/HSS 810. The UE 802 sends in IKE_AUTH Request to the ePDG, which includes a routing rule. A routing rule defines which IP flow goes over WiFi+ePDG. For IKEv2, a routing rule is represented as a traffic selector and each traffic selector consists of an address range, a port range, and an IP protocol ID. To de-activate the routing rule, the protocol ID is set to a suitable value, such as 254. In IANA, Protocol id of 254 is used for experimentation and testing.

In operation 830, the ePDG 804 transmits a proxy binding update message to the packet data network (PDN) gateway (GW) 806. In addition, the proxy binding update message includes the routing rule.

In operation 835, if dynamic policy and charge control (PCC) is supported, the PDN GW 806 initiates the IP-CAN session establishment procedure with the policy and charging rules function (PCRF) 808. The PDN GW 806 sends the routing rule to the PCRF 808. The PCRF 808 may modify the routing rules for the downlink or uplink, and send the modified routing rule to the PDN GW 806.

In operation 840, the selected PDN GW 806 informs the 3GPP AAA server of the PDN GW 806 identity. The 3GPP AAA server informs the HSS 810 of the PDN GW 806 identity and APN associated with the UE's 802 PDN connection. The message includes information that identifies the public land mobile network (PLMN) in which the PDN GW 806 is located.

In operation 845, the PDN GW 806 creates a proxy mobile IP (PMIP) v6 binding and installs the IP flow routing rules. The PDN GW 806 sends a proxy binding acknowledge message to the ePDG 804. The proxy binding acknowledgement indicates which routing rules requested by the UE 802 are accepted by including the routing filter accepted by the PDN GW 806.

In operation 850, after the proxy binding update is successful, the ePDG 804 is authenticated by the UE 802 and indicates to the UE 802 that the authentication and authorization with the external AAA server is successful.

In operation 855, the ePDG 804 transmits to the UE 802 the IKE_AUTH response including the traffic selector that carries the routing filter accepted by the PDN GW 806.

Although FIG. 8 illustrates one example of a sequence flow 800 for pre-setup of an IPSec connection over WLAN+ ePDG, various changes may be made to FIG. 8. For example, while shown as a series of operations, various operations could overlap, occur in parallel, occur in a different order, or occur multiple times.

FIG. 9 illustrates an example traffic selector 900 according to various embodiments of the present disclosure.

The traffic selector 900 includes a traffic selector type 905, a IP protocol ID 910, a selector length 915, a start port 920, an end port 925, a starting address 930, and an ending address 935. For IKEv2, a routing rule is represented as a traffic selector 900 and each traffic selector consists of an address range, a port range, and an IP protocol ID 910. To de-activate the routing rule, the protocol ID 910 is set to a suitable value, such as 254. In IANA, Protocol id of 254 is used for experimentation and testing data.

Although FIG. 9 illustrates one example of a traffic selector 900, various changes may be made to FIG. 9.

FIG. 10 illustrates an example sequence flow for activation of the pre-setup tunnel based on NB-IP Flow Mobility according to various embodiments of the present disclosure.

In operation 1020, the UE 1002 is connected simultaneously to 3GPP and non-3GPP accesses and establishes multiple IP flows of the same PDN connection.

In operation 1025, the UE 1002 transmits to the ePDG 1004 the IKEv2 informational request, which includes the modified routing rule to indicate the updated routing rule requested by the UE 1002. Specifically, UE send the updated routing rule (e.g. Protocol ID=17–UDP) to Network to allow the traffic (e.g. voice or video) move from LTE to WLAN In operation 1030, the ePDG 1004 transmits a proxy binding update message to the PDN GW 1006. In addition, the proxy binding update includes the routing rule. If the ePDG 1004 supports multiple PDN connections to a single APN, the ePDG 1004 also includes the PDN connection ID based on the mapping between the security association and the PDN connection, instead of allocating a new PDN connection ID.

In operation 1035, IP-CAN session modification procedures are performed. The PDN GW 1006 provides the modified routing rule to the PCRF 1008. The PCRF 1008 may update the routing rules for the downlink or uplink, and send the modified routing rule to the PDN GW 1006.

In operation 1040, the PDN GW 1006 creates a PMIPv6 binding and installs the IP flow routing rules. The PDN GW 1006 sends a proxy binding acknowledge message to the ePDG. The proxy binding acknowledgement indicates which routing rules requested by the UE 1002 are accepted by including the routing filter accepted by the PDN GW 1006.

In operation 1045, the ePDG 1004 transmits to the UE 1002 the IKEv2 informational response that includes the traffic selector that carries the routing filter accepted by the PDN GW 1006.

In operation 1050, the non-3GPP specific resource modification is performed based on the modified traffic selector in non-3GPP access network, which can be initiated by the UE 1002. In this case, UDP traffic (e.g. voice or video) is moved from LTE to WLAN.

In operation 1055, appropriate 3GPP resource release or allocation procedures are executed for the resources associated with the flows that were removed, modified or added in the 3GPP access. The PDN GW 1006 or PCRF 1008 initiates these procedures based on the linking between the flows over non-3GPP access and the flows of the same PDN connection over 3GPP access.

Although FIG. 10 illustrates one example of a flow chart of a fast VoWiFi tunnel setup using a partial tunnel pre-setup, various changes may be made to FIG. 10. For example, while shown as a series of operations, various operations could overlap, occur in parallel, occur in a different order, or occur multiple times.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A user equipment (UE) for VoWiFi handoff, the UE comprising:
   a memory; and
   one or more processors operably connected to the memory, wherein the one or more processors are configured to:
      obtain a reference signal received power (RSRP) for a long term evolution (LTE) signal and a reference signal strength indicator (RSSI) for a WiFi signal;
      in response to determining at least the obtained RSSI of the WiFi signal is greater than an RSSI threshold, perform a pre-setup of an internet protocol security (IPsec) tunnel to partially establish the IPsec tunnel;
      determine whether a handoff is to be performed after completion of the pre-setup of the IPsec tunnel;
      in response to a determination that the handoff is not to be performed, delete the partially established IPsec tunnel; and
      in response to a determination that the handoff is to be performed, perform a completion of a process to establish the IPsec tunnel.

2. The UE of claim 1, wherein the one or more processors are further configured to perform the pre-setup of the IPsec tunnel in response to the RSSI of the WiFi signal being greater than an RSSI threshold when the UE is in a WiFi preferred mode.

3. The UE of claim 1, wherein the one or more processors are further configured to perform the pre-setup of the IPsec tunnel in response to the RSRP of the LTE signal being less than an RSRP threshold and the RSSI of the WiFi signal being greater than an RSSI threshold when the UE is in a cellular preferred mode.

4. The UE of claim 1, wherein:
   the pre-setup of the IPsec tunnel includes a first phase of establishing an internet key exchange (IKE) security association, and
   the one or more processors are further configured to control a transceiver to:
      transmit an initial request message; and
      receive an initial request response.

5. The UE of claim 4, wherein:
   the pre-setup of the IPsec tunnel includes a partial IKE Phase 2 procedure;
   the one or more processors are further configured to control the transceiver to:
      transmit an IKE authentication request message including a handoff IP, a new vender attribute for a setup timer extension, wherein the setup timer extension is set to a value to extend a connect setup timer to not time out before handoff is required;
      receive an EAP-AKA authentication challenge request message;
      transmit an EAP-AKA challenge calculation result message; and
      receive an EAP success message; and
   to perform a completion of the IPsec tunnel setup in response to a determination that the handoff is to be performed, the one or more processors are further configured to:
      trigger a last IKE authentication;
      control the transceiver to transmit an authentication request message;
      control the transceiver to receive an authentication response message in which an IP address is allocated;
      configure a tunnel using the WiFi; and
      control the transceiver to transmit data over the WiFi.

6. The UE of claim 1, wherein the pre-setup of the IPsec tunnel comprises the one or more processors are further configured to perform a pre-setup of an IPSec connection over the WiFi via IP flow mobility mechanism when a network supports network based IP flow mobility, wherein a routing rule is set as de-activated to not allow traffic to pass through the IPsec tunnel.

7. The UE of claim 6, wherein to perform a completion of the IPsec tunnel comprises the one or more processors configured to:
set the routing rule to be activated for the IPSec connection, and
perform handoff of the traffic from LTE to WiFi.

8. A method for VoWiFi handoff, the method comprising:
obtaining a reference signal received power (RSRP) for a long term evolution (LTE) signal and a reference signal strength indicator (RSSI) for a WiFi signal;
in response to determining at least the obtained RSSI for the WiFi signal being greater than an RSSI threshold, performing a pre-setup of an internet protocol security (IPsec) tunnel to partially establish the IPsec tunnel;
determining whether a handoff is to be performed after completion of the pre-setup of the IPsec tunnel;
in response to a determination that the handoff is not to be performed, deleting the partially established IPsec tunnel; and
in response to determining that the handoff is to be performed, performing a completion of a process to establish the IPsec tunnel.

9. The method of claim 8, wherein performing the pre-setup of the IPsec tunnel comprises performing the pre-setup in response to the RSSI of the WiFi signal being greater than the RSSI threshold when a user equipment (UE) is in a WiFi preferred mode.

10. The method of claim 8, wherein performing the pre-setup of the IPsec tunnel comprises performing the pre-setup in response to the RSRP for the LTE signal being less than an RSRP threshold and the RSSI of the WiFi signal being greater than an RSSI threshold when a UE is in a cellular preferred mode.

11. The method of claim 8, wherein the pre-setup of the IPsec tunnel includes a first phase of establishing an internet key exchange (IKE) security association comprising:
transmitting an initial request message; and
receive an initial request response.

12. The method of claim 9, wherein:
the pre-setup of the IPsec tunnel includes a partial IKE Phase 2 procedure comprising:
transmitting an IKE authentication request message including a handoff IP, a new vender attribute for a setup timer extension, wherein the setup timer extension is set to a value to extend a connect setup timer to not time out before handoff is required;
receiving an EAP-AKA authentication challenge request message;
transmitting an EAP-AKA challenge calculation result message; and
receiving an EAP success message; and
performing a completion of the IPsec tunnel setup in response to a determination that the handoff is to be performed comprises:
triggering a last IKE authorization;
transmitting an authentication request message;
receiving an authentication response message in which an IP address is allocated;
configuring a tunnel using the WiFi; and
transmitting data over the WiFi.

13. The method of claim 8, wherein the pre-setup of the IPsec tunnel comprises performing a pre-setup of an IPSec connection over the WiFi via IP flow mobility mechanism when a network supports network based IP flow mobility, wherein a routing rule is set as de-activated to not allow traffic to pass through the IPsec tunnel.

14. The method of claim 13, wherein performing a completion of the IPsec tunnel setup in response to determining whether the handoff is to be performed comprises:
setting the routing rule to activated for the IPSec connection, and
performing handoff of the traffic from LTE to WiFi.

15. A non-transitory computer readable medium embodying a computer program, the computer program comprising computer readable program code that when executed by at least one processing device, causes a user equipment (UE) to:
obtain a reference signal received power (RSRP) for a long term evolution (LTE) signal and a reference signal strength indicator (RSSI) for a WiFi signal;
in response to determining at least the obtained RSSI of the WiFi signal is greater than an RSSI threshold, perform a pre-setup of an internet protocol security (IPsec) tunnel to partially establish the IPsec tunnel;
determine whether a handoff is to be performed after completion of the pre-setup of the IPsec tunnel;
in response to a determination that the handoff is not to be performed, delete the partially established IPsec tunnel; and
in response to a determination that the handoff is to be performed, perform a completion of a process to establish the IPsec tunnel.

16. The non-transitory computer readable medium of claim 15, wherein the computer readable program code that when executed further causes the UE to perform the pre-setup of the IPsec tunnel in response to the RSSI of the WiFi signal being greater than an RSSI threshold when the UE is in a WiFi preferred mode.

17. The non-transitory computer readable medium of claim 15, wherein the computer readable program code that when executed further causes the UE to perform the pre-setup of the IPsec tunnel in response to the RSRP of the LTE signal being less than an RSRP threshold and the RSSI of the WiFi signal being greater than an RSSI threshold when the UE is in a cellular preferred mode.

18. The non-transitory computer readable medium of claim 15, wherein the pre-setup of the IPsec tunnel includes a first phase of establishing an internet key exchange (IKE) security association comprising the computer program comprising the computer readable program code that when executed further causes the UE to:
transmit an initial request message; and
receive an initial request response.

19. The non-transitory computer readable medium of claim 16, wherein:
the pre-setup of the IPsec tunnel includes a partial IKE phase 2 procedure comprising the computer readable program code that when executed further causes the UE to:
transmit an IKE authentication request message including a handoff IP, a new vender attribute for a setup timer extension, wherein the setup timer extension is set to a value to extend a connect setup timer to not time out before handoff is required;
receive an EAP-AKA authentication challenge request message;

transmit an EAP-AKA challenge calculation result message; and
receive an EAP success message; and
to perform a completion of the IPsec tunnel setup in response to the determination that the handoff is to be performed comprises the computer readable program code that when executed further causes the UE to:
trigger a last IKE authorization;
transmit an authentication request message;
receive an authentication response message in which an IP address is allocated;
configure a tunnel using the WiFi; and
transmit data over the WiFi.

20. The non-transitory computer readable medium of claim 15, wherein:
the pre-setup of the IPsec tunnel comprises the computer readable program code that when executed further causes the UE to perform a pre-setup of an IPSec connection over the WiFi via IP flow mobility mechanism when a network supports network based IP flow mobility, wherein a routing rule is set as de-activated to not allow traffic to pass through the IPsec tunnel; and
to perform a completion of the IPsec tunnel comprises the computer readable program code that when executed further causes the UE to:
set the routing rule to activated for the IPSec connection, and
perform handoff of the traffic from LTE to WiFi.

* * * * *